(12) United States Patent
Caram

(10) Patent No.: US 7,826,358 B2
(45) Date of Patent: Nov. 2, 2010

(54) HIERARCHICAL VIRTUAL QUEUING

(75) Inventor: Bruce E. Caram, Hudson, MA (US)

(73) Assignee: Ellacoya Networks, Inc., Chelmsford, MA (US)

( * ) Notice: Subject to any disclaimer, the term of this patent is extended or adjusted under 35 U.S.C. 154(b) by 925 days.

(21) Appl. No.: 11/648,141

(22) Filed: Dec. 29, 2006

(65) Prior Publication Data
US 2008/0159135 A1 Jul. 3, 2008

(51) Int. Cl.
H04L 12/56 (2006.01)
(52) U.S. Cl. ........................ 370/230; 370/235
(58) Field of Classification Search .............. 370/230, 370/235
See application file for complete search history.

(56) References Cited

U.S. PATENT DOCUMENTS

| | | | |
|---|---|---|---|
| 5,903,559 A | 5/1999 | Acharya et al. | |
| 6,438,135 B1 | 8/2002 | Tzeng | 370/412 |
| 6,636,504 B1 | 10/2003 | Albers et al. | |
| 6,683,884 B1 | 1/2004 | Howard | 370/412 |
| 6,781,956 B1 * | 8/2004 | Cheung | 370/235.1 |
| 6,829,649 B1 * | 12/2004 | Shorey et al. | 709/235 |
| 6,862,265 B1 | 3/2005 | Appala et al. | 370/235 |
| 6,934,250 B1 | 8/2005 | Kejriwal et al. | |
| 7,020,080 B1 | 3/2006 | Mitra et al. | 370/229 |
| 7,027,449 B2 * | 4/2006 | Garcia-Luna-Aceves et al. | 370/401 |
| 7,307,949 B1 * | 12/2007 | Washburn et al. | 370/230 |
| 7,327,682 B2 * | 2/2008 | Gandhi et al. | 370/235.1 |
| 7,385,987 B1 * | 6/2008 | Charny et al. | 370/395.4 |
| 7,542,417 B2 * | 6/2009 | Babonneau et al. | 370/230 |
| 7,564,790 B2 * | 7/2009 | Burns et al. | 370/235 |
| 7,609,634 B2 * | 10/2009 | Chow | 370/232 |
| 2005/0005023 A1 | 1/2005 | Dobbins et al. | |
| 2005/0073997 A1 | 4/2005 | Riley et al. | |
| 2008/0008090 A1 * | 1/2008 | Gilfix | 370/230 |

OTHER PUBLICATIONS

Meeting the Challenges of VoIP ATA Designs, Jeff Dionne, Arcturus Networks; and Brian Davis, Renesas Technology America, Jun. 8, 2004 www.commsdesign.com.
International Preliminary Report on Patentability dated Jul. 9, 2009, from Counterpart International Application No. PCT/US2007/026399, filed on Dec. 28, 2007.

* cited by examiner

Primary Examiner—Ricky Ngo
Assistant Examiner—Ben H Liu
(74) Attorney, Agent, or Firm—Houston Eliseeva LLP

(57) ABSTRACT

A system and method of providing high speed, prioritized delivery of data packets over broadband communications networks that avoids inducing unwanted latency in data packet transmission. The system employs a hierarchical, real-time, weighted token bucket prioritization scheme that provides for fair sharing of the available network bandwidth. At least one token bucket is employed at each level of the hierarchy to meter data flows providing service applications included in multiple subscribers' service plans. Each token bucket passes, discards, or marks as being eligible for subsequent discarding data packets contained in the data flows using an algorithm that takes into account the priority of the data packets, including strict high, strict medium, and strict low priorities corresponding to strict priority levels that cannot be overridden. The algorithm also takes into account weighted priorities of at least a subset of the low priority data packets. The priority levels of these low priority data packets are weighted to provide for fair sharing of the available network bandwidth among the low priority data flows, and to assure that none of the low priority data flows is starved of service.

15 Claims, 4 Drawing Sheets

HIERARCHICAL VIRTUAL QUEUING

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates generally to high speed network communications, and more specifically to the prioritized delivery of data packets from a network switch over a broadband communications network.

In recent years, there has been an increasing need for systems and methods of efficiently delivering data packets over computer and communications networks to enforce specified data packet transmission rates and quality of service (QoS) objectives. A typical QoS objective of such systems is to deliver high priority data packets over a communications network before or more efficiently than medium or low priority data packets. For example, high priority data packets may correspond to data flows involving voice over Internet protocol (VoIP) or Internet protocol television (IPTV), medium priority data packets may correspond to data flows for providing mail or newsgroup services, and low priority data packets may correspond to data flows generated for peer-to-peer (P2P) file sharing. Because missing or delayed delivery of data packets from data flows involving VoIP or IPTV can significantly degrade the quality of these service applications, such data packets are generally given a higher priority over those included in mail, news, or file transmissions, in which the effects of missing or delayed data packets are often imperceptible to a human operator.

To achieve such enforcement of data packet transmission rates and QoS objectives, a number of traffic shaping and prioritization techniques have been developed. For example, one conventional prioritization technique is known as "round robin queuing", which employs a set of queues or buffers for temporarily storing data packets before the packets are delivered over a communications network. For example, the set of queues may include a high priority queue for storing high priority data packets, a medium priority queue for storing medium priority data packets, and a low priority queue for storing low priority data packets. The round robin queuing technique typically employs an algorithm to determine the level of priority of each data packet, and the queue to which the data packet should be assigned. Further, at least one meter such as a token bucket may be employed to assure that the data packets assigned to one or more of the queues conform to the requirements of a specified constant or variable bit-rate service. After the respective data packets are assigned to the high priority, medium priority, and low priority queues, a predetermined number of data packets are delivered over the network from the high priority queue, and, in a descending order of priority, the same number of data packets is delivered over the network from each of the medium and low priority queues in a round robin fashion. When the predetermined number of data packets has been delivered over the network from each of the high priority, medium priority, and low priority queues, the process of delivering data packets over the network repeats, starting again with the highest priority queue.

Another conventional prioritization technique is known as "weighted round robin queuing". Whereas the round robin queuing technique described above typically delivers the same number of data packets over a communications network from each of the high, medium, and low priority queues and therefore services each of the queues at substantially the same rate, the weighted round robin queuing technique services the higher priority queues more frequently than the lower priority queues, thereby increasing the likelihood that the QoS objectives of the higher priority data packets will be met. For example, the weighted round robin queuing technique may be employed to deliver a larger predetermined number of data packets over the network from the high priority queue, and, in a descending order of priority, subsequently deliver a smaller predetermined number of data packets from the medium and low priority queues in a round robin fashion. When the predetermined numbers of data packets have been delivered over the network from the high priority, medium priority, and low priority queues, the process of delivering data packets over the network repeats, starting again from the highest priority queue. For example, each of the round robin queuing techniques described above may be implemented in a network element or switch coupled to a communications network and configured to perform data packet transmission over the network.

Although the conventional prioritization techniques described above have been used to provide prioritized delivery of data packets over computer and communications networks, such conventional prioritization techniques have drawbacks when employed in conjunction with high speed broadband communications networks configured to handle high bandwidth service applications such as VoIP and IPTV. For example, the prioritized queuing of data packets that occurs in each of the conventional round robin queuing techniques described above may induce unwanted latency in the transmission of high priority data packets for providing VoIP and IPTV service applications. In addition, because network service providers typically have numerous subscribers and often require many levels of priority to handle the various types of service applications that they provide to their subscribers, the number of queues or buffers required to implement the conventional round robin queuing techniques can be high, thereby significantly increasing the cost of the switch implementing these prioritization techniques.

It would therefore be desirable to have an improved system and method of providing high speed, prioritized delivery of data packets over broadband communications networks that avoids the drawbacks of conventional data traffic shaping and prioritization techniques.

BRIEF SUMMARY OF THE INVENTION

In accordance with the present invention, a system and method of providing high speed, prioritized delivery of data packets over broadband communications networks is disclosed that avoids inducing unwanted latency in the transmission of the data packets, while allowing the cost of the network element or switch in which it is implemented to be reduced. The presently disclosed system and method achieves such high speed, prioritized delivery of data packets using a hierarchical, real-time, weighted token bucket prioritization scheme that provides for fair sharing of the available network bandwidth.

In one embodiment, the presently disclosed system and method is implemented in a network element or switch communicably coupled to a high speed broadband communications network such as the Internet. In this embodiment, the network switch is communicably coupled to a controller for controlling a base station, which is operative to transmit wireless signals to, and receive wireless signals from, a plurality of systems operated by subscribers of a network service provider. For example, each subscriber system may comprise one or more personal computers, Internet telephones, and/or digital televisions. In addition, a plurality of devices such as one or more client computers, one or more server computers, and/or one or more Internet telephones is communicably coupled to the broadband communications network. Each of the subscribers has a subscription to a selected service plan of the network service provider. For example, each selected service plan may provide access to multiple Internet service applications including but not limited to voice over Internet protocol (VoIP), Internet protocol television (IPTV), video on demand (VoD), video streaming, audio streaming, mail, news, gaming, and/or peer-to-peer (P2P) file sharing. Further, each data flow transmitted over the broadband network during the provision of a respective service application has an associated level of priority. For example, a data flow corresponding to VoIP or IPTV generally contains high priority data packets, a data flow corresponding to mail or news generally contains medium priority data packets, and a data flow corresponding to P2P file sharing generally contains low priority data packets.

To assure that specified data packet transmission rates and quality of service (QoS) objectives are enforced while the various service applications are being provided to each subscriber, the presently disclosed system and method employs a control mechanism implemented as a hierarchical, real-time, weighted token bucket that provides for fair sharing of the available network bandwidth. For each subscriber, at least one token bucket is employed at each level of the hierarchy to meter at least one of the data flows generated for providing the service applications included in that subscriber's service plan. For example, for each subscriber, at least one first token bucket may be employed at a first level of the hierarchy to provide a maximum data packet transmission rate for a respective service application, or to implement a weighted prioritization scheme to assure that a lower priority data flow corresponding to the respective service application is not starved of service. Further, for each subscriber, at least one second token bucket may be employed at a second level of the hierarchy to assure that the maximum data packet transmission rate of the service plan selected by that subscriber is never exceeded, even if he or she is currently the only active subscriber. Moreover, at least one third token bucket may be employed at a third level of the hierarchy to assure that a maximum aggregate bandwidth of the wireless base station is shared in a fair and dynamic manner among the currently active subscribers. In addition, at least one fourth token bucket may be employed at a fourth level of the hierarchy to assure that the data flows corresponding to the respective subscribers conform to the maximum aggregate bandwidth of the wireless base station. Because the hierarchical token bucket prioritization scheme implemented by the presently disclosed system performs no buffering of data packets, the number of active subscribers per service application can be determined substantially instantaneously, and the specified data packet transmission rates and QoS objectives of each subscriber can be enforced in real-time, with minimal latency.

Specifically, each token bucket employed in the above described hierarchical, real-time, fair, weighted token bucket prioritization scheme can be used to determine, substantially instantaneously, whether or not a particular data flow has exceeded an allowed data packet transmission rate. Based upon this determination, the token bucket operates to discard ("drop"), to mark as being eligible for subsequent discarding, or to pass the data packets contained in the data flow, using an algorithm that takes into account the priority of the data packets. In the presently disclosed embodiment, the token bucket algorithm takes into account three strict levels of priority, namely, a strict high priority, a strict medium priority, and a strict low priority. The strict high, strict medium, and strict low priorities correspond to strict priority levels that cannot be overridden. The token bucket algorithm allows a token bucket to raise the priority of a low priority data packet to medium priority, and to raise the priority of a medium priority data packet to high priority. For example, the first token bucket employed at the first level of the hierarchy may have an associated non-zero weight, and an associated accumulated weight. The token bucket's non-zero weight is added to its accumulated weight when all of the token buckets in the hierarchy determine that a rate limit condition exists. When the token bucket's accumulated weight reaches a predetermined maximum accumulated weight, the priority of the next data packet passing through that token bucket is raised, and continues to be raised until a packet successfully passes through the hierarchy of token buckets. The weighted priorities provide for fair sharing of the available network bandwidth among designated low priority data flows, and to assure that none of the designated low priority data flows is starved of service. Moreover, the depth of each token bucket is allowed to "go negative" as a result of token subtraction.

According to the token bucket algorithm, if the depth of the token bucket is determined to be equal to zero or a negative value, then incoming low priority data packets are rate limited. If the incoming low priority data packets are designated as having a low priority level, then the "$n^{th}$" low priority data packet that would otherwise be rate limited is promoted to medium priority, based upon the token bucket's accumulated weight. Otherwise, the incoming low priority data packets are discarded or "dropped" from the network, or marked as being eligible for subsequent discarding, if, for example, the network is overloaded. The incoming low priority data packets will continue to be rate limited in this manner until the token bucket receives more tokens to make its depth positive again. If the depth of the token bucket is determined to be equal to or less than a value that is proportional to "−1" times the metered data packet transmission rate, then incoming low and medium priority data packets are rate limited, i.e., the incoming low and medium priority data packets are discarded, or marked as being eligible for subsequent discarding. In this case, all of the incoming low and medium priority data packets will continue to be rate limited in this manner until the token bucket receives more tokens to make its depth greater than −1 times the metered data packet transmission rate. If the depth of the token bucket is determined to be equal to or less than a value that is proportional to "−2" times the metered data packet transmission rate, then all incoming low, medium, and high priority data packets are rate limited, i.e., the incoming low, medium, and high priority data packets are discarded, or marked as being eligible for subsequent discarding. In this case, all of the incoming data traffic will continue to be rate limited in this manner until the token bucket receives more tokens to make its depth greater than −2 times the metered data packet transmission rate.

By employing a hierarchical, real-time, weighted token bucket prioritization scheme that provides for fair sharing of the available network bandwidth and requires no buffering of data packets, high speed prioritized delivery of data packets over a broadband communications network can be achieved via a low cost network element or switch, without inducing unwanted latency in the data packet transmission.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A system and method of providing high speed, prioritized delivery of data packets over a broadband communications network is disclosed that employs a hierarchical, real-time, fair, weighted token bucket prioritization scheme requiring no buffering of the data packets. Because the token bucket prioritization scheme requires no queues or buffers for delivering the data packets over the broadband network, the presently disclosed system can enforce specified data packet transmission rates and quality of service (QoS) objectives in real-time with minimal latency. In addition, the presently disclosed system can be implemented within a network element or switch for reduced cost.

Figure 1:
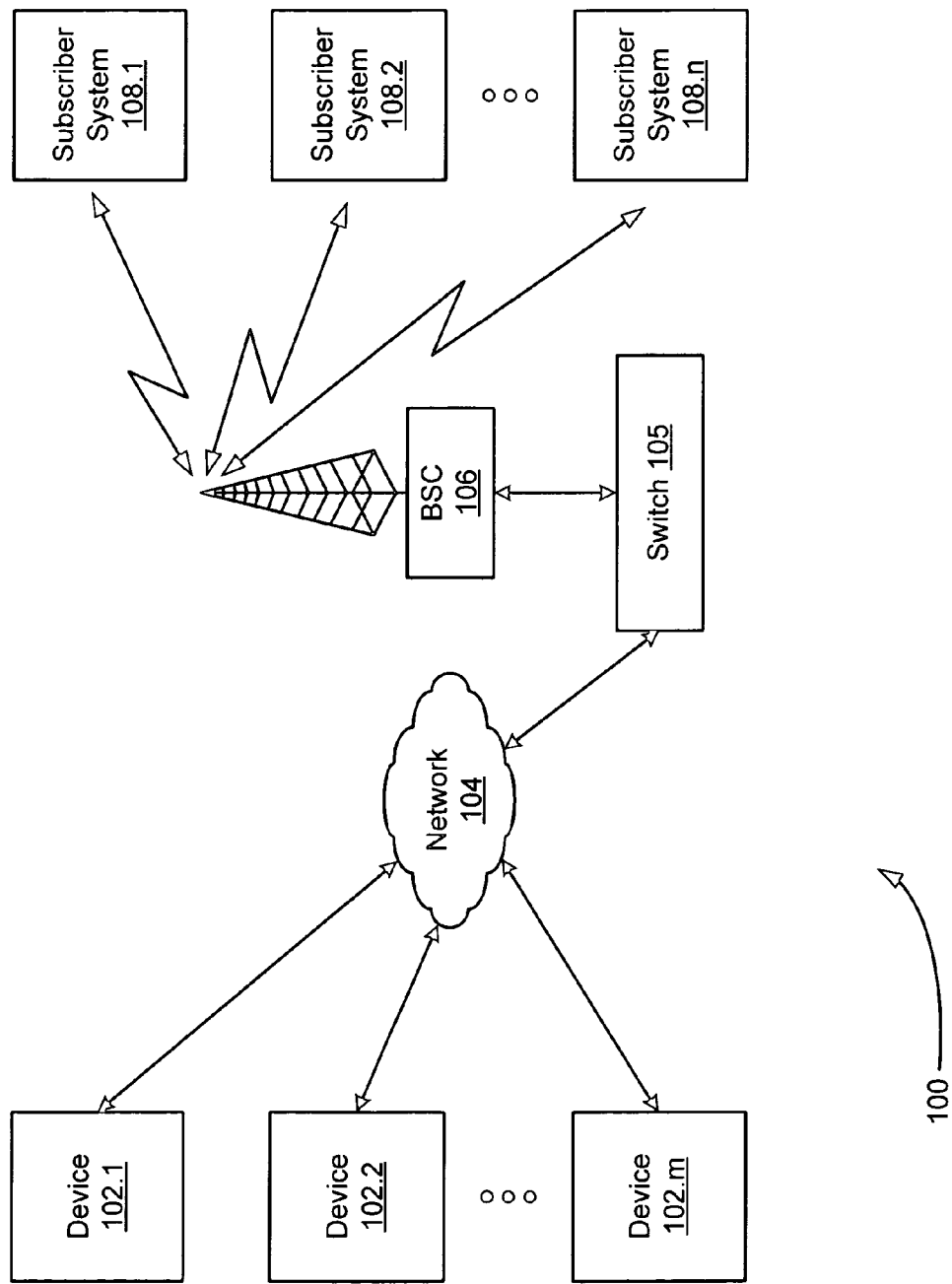
FIG. 1 is a block diagram of a high speed communications system that incorporates a network switch implementing a hierarchical, real-time, fair, weighted token bucket prioritization scheme, according to the present invention.

FIG. 1 depicts an illustrative embodiment of a high speed communications system 100 incorporating a network switch 105 that implements a hierarchical, real-time, fair, weighted token bucket prioritization scheme, in accordance with the present invention. As shown in FIG. 1, the communications system 100 includes a plurality of devices 102.1-102.$m$, a broadband communications network 104 such as the Internet, the network switch 105, a wireless base station controller (BSC) 106 for controlling a wireless base station (not numbered), and a plurality of subscriber systems 108.1-108.$n$. The plurality of devices 102.1-102.$m$ and the network switch 105 are communicably coupled to the broadband network 104. For example, the plurality of devices 102.1-102.$m$ may include one or more client computers, one or more server computers, one or more Internet telephones, and/or any other suitable device communicably coupleable to the broadband network 104. The network switch 105 is also communicably coupled to the BSC 106, which is operative to control the base station for transmitting wireless signals to, and receiving wireless signals from, the plurality of subscriber systems 108.1-108.$n$.

In the presently disclosed embodiment, each of the subscriber systems 108.1-108.$n$ is associated with a human operator who subscribes to a selected service plan of a network service provider. For example, each selected service plan may provide access to multiple Internet service applications including but not limited to voice over Internet protocol (VoIP), Internet protocol television (IPTV), video on demand (VoD), video streaming, audio streaming, mail, news, gaming, peer-to-peer (P2P) file sharing, and/or any other suitable Internet service application. Each of the subscriber systems 108.1-108.$n$ may therefore include a personal computer, an Internet telephone, a digital television, and/or any other device suited for the types of Internet service applications specified in the subscriber's service plan. For example, each subscriber system 108.1-108.$n$ comprising an Internet telephone may communicate with another Internet telephone included in the plurality of devices 102.1-102.$m$ using VoIP, each subscriber system 108.1-108.$n$ comprising a digital television may receive IPTV signals from a server computer included in the plurality of devices 102.1-102.$m$, and each subscriber system 108.1-108.$n$ comprising a personal computer may engage in P2P file sharing with a client computer included in the plurality of devices 102.1-102.$m$. In addition, each data flow transmitted over the broadband network 104 for providing a respective service application has an associated level or priority. For example, each data flow corresponding to VoIP or IPTV contains high priority data packets, each data flow corresponding to mail or news contains medium priority data packets, and each data flow corresponding to P2P file sharing contains low priority data packets. Each data packet carries a service level attribute, as indicated by a corresponding field in the packet header, which permits the packet to be forwarded at one of the high, medium, and low priority levels.

It is noted that the term "data packet" is meant to encompass any data unit such as a packet, frame, or message that is capable of being transmitted over the broadband network 104. Further, the network switch 105 communicably coupled to the broadband network 104 and the base station controller 106 may comprise any suitable network element configured to implement a layer of the open systems interconnect (OSI) protocol stack. For example, the network switch 105 may comprise a layer 1 switch, a layer 2 switch, or a layer 3 switch such as a router. It should be understood, however, that the network switch 105 may comprise any other suitable switch or network element, and may be implemented either in whole or in part in hardware or software.

Figure 2:
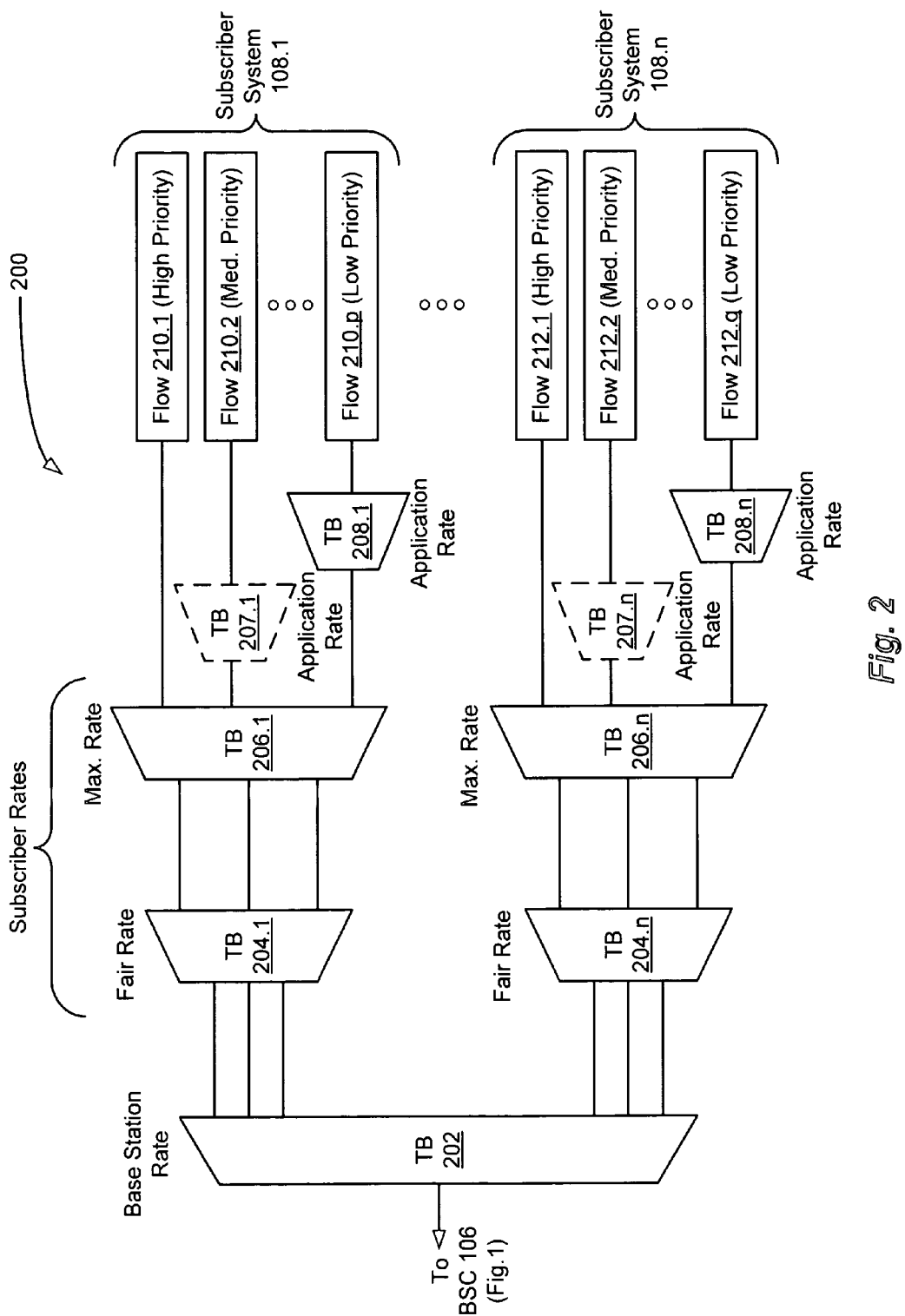
FIG. 2 is a block diagram illustrating a hierarchy of token buckets employed in the hierarchical, real-time, fair, weighted token bucket prioritization scheme implemented by the system of FIG. 1.

Specifically, the network switch 105 is configured to apply one or more policies defined by the network service provider for enforcing specified data packet transmission rates and quality of service (QoS) objectives during the provision of the various service applications to each subscriber. In the presently disclosed embodiment, the network switch 105 implements a hierarchical, real-time, weighted token bucket prioritization scheme that provides for fair sharing of the available network bandwidth. FIG. 2 depicts an illustrative embodiment of a hierarchy of token buckets 200 configured to implement the hierarchical token bucket prioritization scheme. In the illustrated embodiment, the hierarchy of token buckets 200 is configured to meter multiple data flows corresponding to the plurality of subscriber systems 108.1-108.$n$ (see also FIG. 1). For example, the data flows corresponding to the subscriber system 108.1 may include a data flow 210.1 containing high priority data packets, a data flow 210.2 containing medium priority data packets, and a data flow 210.$p$ containing low priority data packets. Similarly, the data flows corresponding to the subscriber system 108.$n$ may include a data flow 212.1 containing high priority data packets, a data flow 212.2 containing medium priority data packets, and a data flow 212.$q$ containing low priority data packets. As described above, the data flows 210.1 and 212.1 containing high priority data packets may correspond to service applications involving VoIP or IPTV, the data flows 210.2 and 212.2 containing medium priority data packets may correspond to mail or news service applications, and the data flows 210.p and 212.q containing low priority data packets may be generated for P2P file sharing.

As shown in FIG. 2, the hierarchy of token buckets 200 includes a plurality of token buckets (TB) 208.1-208.n disposed at a first level of the hierarchy 200, a plurality of token buckets (TB) 206.1-206.n disposed at a second level of the hierarchy 200, a plurality of token buckets (TB) 204.1-204.n disposed at a third level of the hierarchy 200, and a token bucket (TB) 202 disposed at a fourth level of the hierarchy 200. In the presently disclosed embodiment, the token buckets 208.1, 208.n in the first level of the hierarchy 200 are operative to enforce a maximum data packet transmission rate (the "application rate") for the data flows 210.p, 212.q, respectively, containing low priority data packets, or to implement a weighted prioritization scheme to assure that the data flows 210.p, 212.q containing low priority data packets are not starved of service. For example, each of the token buckets 208.1, 208.n may be configured to raise the priority of an incoming low priority data packet to medium priority according to the weighted prioritization scheme, as further described below. As noted above, the data flows 210.p, 212.q containing low priority data packets may correspond to P2P file sharing. Accordingly, the token buckets 208.1, 208.n may be configured to meter the data flows 210.p, 212.q, respectively, to provide a maximum data packet transmission rate for the P2P file sharing.

Further, the token buckets 206.1-206.n in the second level of the hierarchy 200 are configured to meter the data flows 210.1-210.p, 212.1-212.q to assure that the maximum data packet transmission rate, as defined for each subscriber by the service provider, is never exceeded, even if only one of the subscribers is currently active. Moreover, the token buckets 204.1-204.n, 206.1-206.n in the third level of the hierarchy 200 are operative to enforce, for the respective subscriber systems 108.1, 108.n, the data packet transmission rates (the "subscriber rates", i.e., the "fair rates" and the "max. rates") defined by the service provider. Specifically, the token buckets 204.1, 204.n are configured to meter the data flows 210.1-210.p, 212.1-212.q, corresponding to the subscriber systems 108.1, 108.n, respectively, to assure that the maximum aggregate bandwidth of the wireless base station is shared in a fair and dynamic manner among the currently active subscribers.

In addition, the token bucket 202 in the fourth level of the hierarchy 200 is operative to enforce the specified data packet transmission rate (the "base station rate") of the wireless base station. Specifically, the token bucket 202 is configured to meter the data flows 210.1-210.p, 212.1-212.q corresponding to the subscriber systems 108.1, 108.n, respectively, to assure that the data flows 210.1-210.p, 212.1-212.q conform to the maximum aggregate bandwidth of the wireless base station. The data flows that do not conform to the maximum aggregate bandwidth of the wireless base station are rate limited. For example, the data packets included in such data flows are either discarded or marked for subsequent discarding.

In one embodiment, if incoming data packets exceed the data packet transmission rate of the token buckets 204.1, 204.n based upon the effective priority of the data packets, then the data packets are tagged. The token bucket 202 is configured so that if it is more than half empty, then it too causes a tagged condition for an incoming data packet. For example, with respect to low priority data packets, the token bucket 202 may be considered to be half empty when the remaining number of tokens in the token bucket 202 is equal to one half of the maximum token capacity of the bucket. With respect to medium priority data packets, the token bucket 202 may be considered to be half empty when the remaining number of tokens in the token bucket 202 is equal to zero. With respect to high priority data packets, the token bucket 202 may be considered to be half empty when the remaining number of tokens in the token bucket 202 is equal to "−1" times one half of the maximum token capacity of the bucket. If at least two tagged conditions are detected for an incoming data packet at the token bucket 202, then the token bucket 202 causes that data packet to be rate limited, i.e., the packet is discarded or marked for possible subsequent discarding. The token bucket 202 also causes incoming data packets to be rate limited if the data packets exceed the specified data packet transmission rate of the token bucket 202.

It should be noted that application rates may also be enforced for one or more of the data flows 210.1, 210.2, 212.1, 212.2. For example, the first level of the hierarchy 200 may further include a plurality of token buckets (TB) 207.1-207.n operative to enforce a maximum data packet transmission rate (the application rate) for the data flows 210.2, 212.2, respectively, containing medium priority data packets, or to implement the weighted prioritization scheme to assure that the data flows 210.2, 212.2 containing medium priority data packets are not starved of service. Like the token buckets 208.1, 208.n, each of the token buckets 207.1, 207.n may be configured to raise the priority of an incoming data packet to a higher priority (i.e., an incoming medium priority data packet may be raised to high priority) according to the weighted prioritization scheme, as further described below. The data packet transmission rates and priorities enforced by the token buckets 207.1, 207.n, 208.1, 208.n would be retained for all subsequent token bucket rate inspections, regardless of their corresponding transmission rates.

In addition, it should be noted that because the hierarchical, real-time, fair, weighted token bucket prioritization scheme implemented by the hierarchy of token buckets 200 requires no buffering of data packets, each of the token buckets 202, 204.1-204.n, 206.1-206.n, 208.1-208.n is operative to determine, substantially instantaneously, whether or not a particular data flow has exceeded a specified minimum, intermediate, maximum, or fair data packet transmission rate. Based upon this determination, each token bucket can operate to pass at least one data packet, or to perform a rate limiting action such as discarding or "dropping" at least one data packet, or marking at least one data packet as being eligible for subsequent discarding if the network is overloaded. To determine whether to pass a data packet or to perform a rate limiting action, each of the token buckets 202, 204.1-204.n, 206.1-206.n, 208.1-208.n employs an algorithm that takes into account the priority of the respective data packets.

Figure 3:
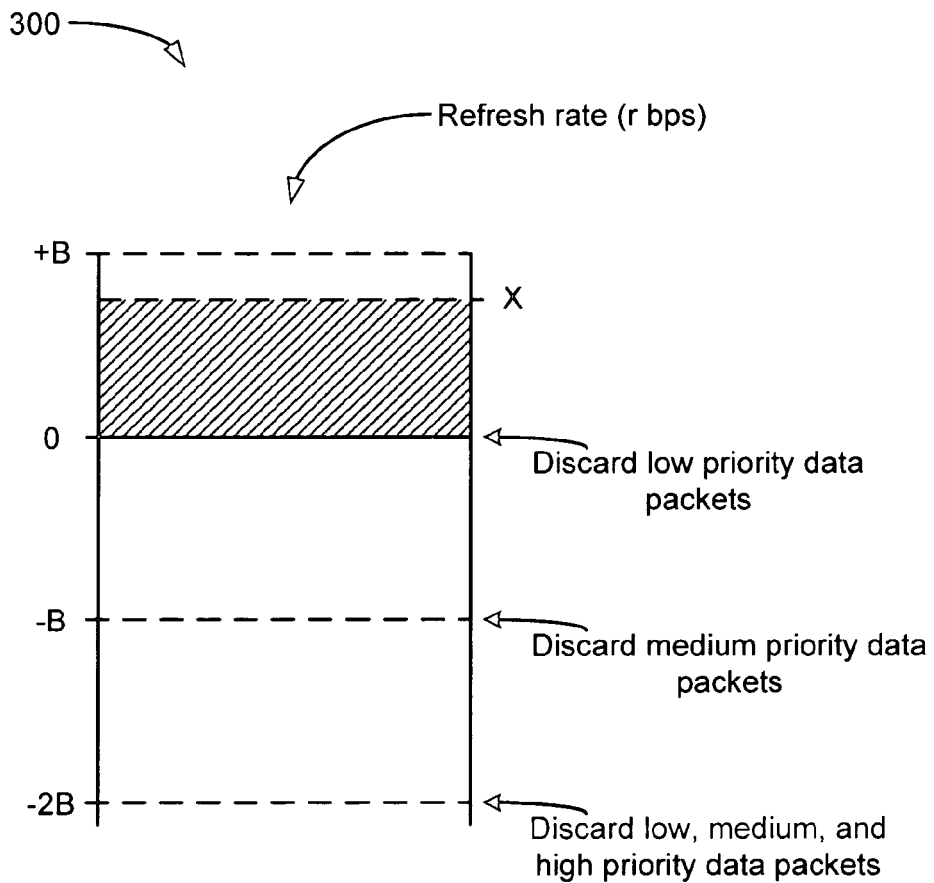
FIG. 3 is a representation of one of the token buckets included in the token bucket hierarchy of FIG. 2.

FIG. 3 depicts an illustrative representation 300 of one of the token buckets included in the hierarchy of token buckets 200 of FIG. 2. With reference to FIG. 3, the depth "X" of the token bucket 300 corresponds to the current number of tokens conceptually contained in the bucket 300. Those of ordinary skill in this art will appreciate that a token bucket determines whether to pass a data packet, to discard (drop) a data packet, or to mark a data packet as being eligible for subsequent discarding based at least in part upon the size "L" of the data packet, and the number of tokens X currently contained in the token bucket. For a conventional token bucket, a single token is generally needed for each byte of the data packet. For example, if a data packet has a size equal to L bytes, then at least L tokens are needed in the conventional token bucket in order for the token bucket to allow the data packet to pass for subsequent transmission. If it is determined that $X \geq L$, then the conventional token bucket passes the data packet, and deducts L tokens from the total number of available tokens X.

Otherwise, if it is determined that X<L, then the conventional token bucket discards the data packet, or marks the data packet as being eligible for subsequent discarding. It is noted that the maximum depth of the token bucket is proportional to the maximum metered data packet transmission rate. Further, the supply of tokens in the token bucket is periodically refreshed at a predetermined rate.

In the presently disclosed embodiment, the token bucket 300 employs an algorithm that takes into account three strict levels of priority of the data packets, namely, a strict high priority, a strict medium priority, and a strict low priority. The strict high, strict medium, and strict low priorities correspond to strict priority levels that cannot be overridden. The token bucket algorithm also takes into account multiple weighted low priority levels, each of which may be promoted to the medium priority level based upon the weight and accumulated weight associated with the token bucket implementing the algorithm. The multiple low priority levels are weighted to provide for fair sharing of the available network bandwidth among designated low priority data flows, and to assure that none of the designated low priority data flows is starved of service. Moreover, the depth X of the token bucket 300 is allowed to "go negative" as a result of token subtraction, as known in the art. As shown in FIG. 3, the maximum depth X of the token bucket 300 is proportional to the maximum metered data packet transmission rate "B", and the supply of tokens in the token bucket 300 is periodically refreshed to its maximum depth X at a predetermined rate of "r" bps.

According to the token bucket algorithm, if an incoming low, medium, or high priority data packet has a size equal to L, and $X \geq L$, then the token bucket 300 allows the low, medium, or high priority data packet to pass, and deducts L tokens from the total number of available tokens X. If the depth X of the token bucket 300 is determined to be equal to zero or a negative value, then the token bucket 300 performs a rate limiting action. For example, the token bucket 300 may discard (drop) all incoming low priority data packets from the network, or mark the incoming low priority data packets as being eligible for subsequent discarding, if, for example, the network is overloaded. The incoming low priority data packets will continue to be rate limited in this manner until the token bucket 300 receives more tokens to make its depth positive again. If $X \leq 0$ but greater than a value proportional to "−1" times the metered data packet transmission rate B ("−B"), then the token bucket 300 allows the medium and high priority data packets to pass, and deducts a number of tokens corresponding to the size L of each medium and high priority data packet from the total number of available tokens X. If $X \leq -B$, then the token bucket 300 discards all incoming low and medium priority data packets, or marks the incoming low and medium priority data packets as being eligible for subsequent discarding if the network is overloaded. In this case, all of the incoming low and medium priority data packets will continue to be rate limited in this manner until the token bucket 300 receives more tokens to make X>−B. If $X \leq -B$ but greater than a value proportional to "−2" times the metered data packet transmission rate B ("−2B"), then the token bucket 300 allows the high priority data packets to pass, and deducts a number of tokens corresponding to the size L of each high priority data packet from the total number of available tokens X. If $X \leq -2B$, then the token bucket 300 discards all incoming data traffic, i.e., all incoming low, medium, and high priority data packets, or marks the incoming low, medium, and high priority data packets as being eligible for subsequent discarding, if, for example, the network is overloaded. In this case, all of the incoming data traffic will continue to be rate limited in this manner until the token bucket receives more tokens to make X>−2B. It is understood that the value of the depth X of the token bucket 300 can be made to be less than zero (X<0) as a result of token subtraction.

Figure 4:
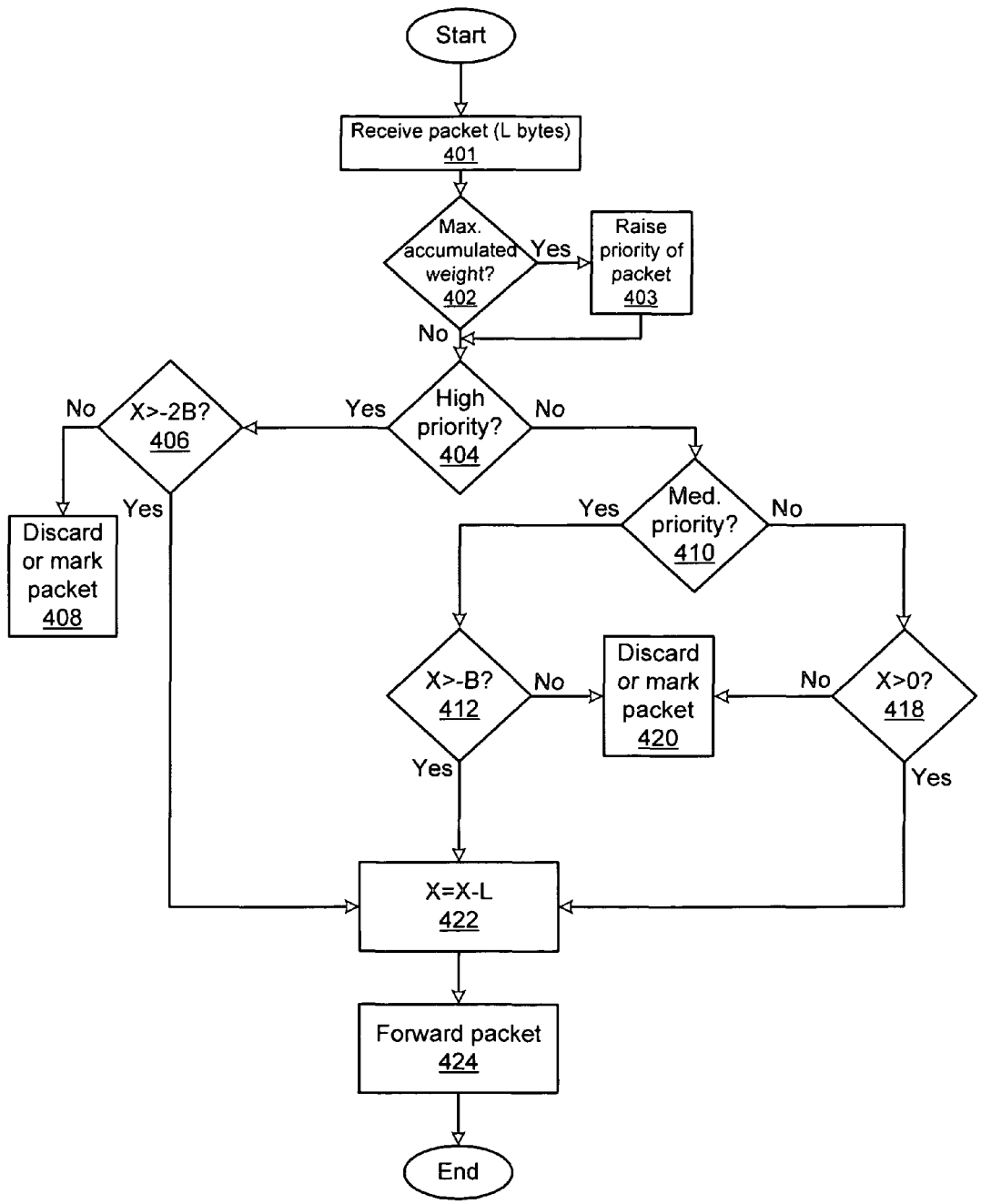
FIG. 4 is a flow diagram of an algorithm executed by the token bucket of FIG. 3 to determine whether to discard a data packet, to mark a data packet as being eligible for subsequent discarding, or to pass the data packet for subsequent transmission over the network.

The presently disclosed token bucket algorithm is described below with reference to FIG. 4. As depicted in step 401, the token bucket receives a data packet having a size equal to L bytes. As described above, the token bucket implementing the token bucket algorithm has an associated weight and an associated accumulated weight. For each data packet that is rate limited by the token bucket, the token bucket's weight is added to its accumulated weight. When the token bucket's accumulated weight reaches a predetermined maximum accumulated weight, the priority of a received data packet is raised by one priority level, so long as the data packet does not have a strict priority that cannot be overridden. A determination is then made as to whether or not the token bucket's accumulated weight has reached the predetermined maximum accumulated weight, as depicted in step 402. In the event the token bucket has reached the maximum accumulated weight, the priority of the received data packet is raised to the next priority level, as depicted in step 403. For example, if the priority of the data packet received in step 401 is low priority and the token bucket's accumulated weight is equal to the predetermined maximum accumulated weight, then the priority of the received low priority data packet is raised to medium priority in step 403, as further described below. Otherwise, the process continues to step 404.

Next, a determination is made as to whether or not the priority of the received data packet is a strict high priority, as depicted in step 404. For example, the priority of the received data packet may be determined by inspecting the service level attribute contained in the packet header. In the event the received data packet is a strict high priority data packet, a determination is made as to whether or not X>−2B, i.e., the depth X of the token bucket is greater than a value proportional to −2 times the metered data packet transmission rate B, as depicted in step 406. If X>−2B, then the process branches to step 422. Otherwise, the data packet is discarded, or marked as being eligible for subsequent discarding, as depicted in step 408. In the event the received data packet is not a strict high priority data packet, a determination is made as to whether or not the priority of the received data packet is a strict medium priority, as depicted in step 410. If the received data packet is a strict medium priority data packet, then a determination is made as to whether or not X>−B, i.e., the depth X of the token bucket is greater than a value proportional to −1 times the metered data packet transmission rate B, as depicted in step 412. If X>−B, then the process branches to step 422. Otherwise, the data packet is discarded, or marked as being eligible for subsequent discarding, as depicted in step 420. In the event the received data packet is neither a strict high priority data packet nor a strict medium priority data packet (i.e., the received data packet is a strict low priority data packet), a determination is made as to whether or not X>0, i.e., the depth X of the token bucket is greater than zero, as depicted in step 418. If X>0, then the process branches to step 422. Otherwise, the process branches to step 420, in which the data packet is discarded or marked as being eligible for subsequent discarding. As depicted in step 422, the size L of the data packet is deducted from the total number of available tokens X (X=X−L). Finally, the high, medium, or low priority data packet is forwarded to the next token bucket disposed in the next level of the hierarchy, if any, as depicted in step 424.

After a data packet has passed through each level of the hierarchy, a determination is made as to whether or not the data packet is to be rate limited. As described above, if at least two tagged conditions are detected for an incoming data packet at the token bucket 202 (see FIG. 2), then the token bucket 202 causes that data packet to be rate limited, i.e., the packet is discarded or marked for subsequent discarding. In the event the data packet is discarded, the weight of each token bucket in the hierarchy is added to that token bucket's accumulated weight, not exceeding the token bucket's predetermined maximum accumulated weight. In the event the data packet is forwarded over the network, the accumulated weight of each token bucket in the hierarchy is reset to zero.

As described above, the strict high, strict medium, and strict low priorities correspond to strict priority levels that cannot be overridden. Further, some low priority data packets and may be promoted to medium priority based upon the accumulated weights of the token buckets that the data packets pass through in the hierarchy. In the presently disclosed token bucket algorithm, the $n^{th}$ low priority data packet that would have been rate limited is promoted to medium priority, in accordance with the TABLE below. It is understood that the TABLE below may also be employed in the event the token bucket algorithm is used to promote medium priority data packets to high priority.

TABLE

| Priority Level Index | Token Bucket Weight | Frequency of promoting low priority data packets to medium priority |
|---|---|---|
| 0 | 0 | Never |
| 1 | 1 | 64 |
| 2 | 2 | 33 |
| 3 | 3 | 22 |
| 4 | 4 | 17 |
| 5 | 5 | 14 |
| 6 | 6 | 12 |
| 7 | 7 | 10 |
| 8 | 8 | 9 |
| 9 | 9 | 8 |
| 10 | 11 | 7 |
| 11 | 13 | 6 |
| 12 | 16 | 5 |
| 13 | 21 | 4 |
| 14 | 32 | 3 |
| 15 | 63 | 2 |
| 16 | 64 | Not applicable |

According to the TABLE above, one or more token buckets in the hierarchy may be assigned a weight. For example, as shown in the TABLE above, a token bucket corresponding to index "0" has an assigned weight of "0", which is the minimum weight, and a token bucket corresponding to index "16" has an assigned weight of "64", which is the maximum weight. In the presently disclosed embodiment, index 0 corresponds to the strict low priority level. Further, index 16 corresponds to the strict high priority level, which may be employed for critical traffic such as high priority service applications involving VoIP and IPTV. Indices 1-15 are the weighted low priority levels, which may be employed to provide the designated low priority data packets corresponding to each of the indices 1-15 at least some access to the network bandwidth based upon the respective token bucket's weight. For example, the indices 1-15 may be employed for low priority service applications such as P2P file sharing. As shown in the TABLE above, a token bucket corresponding to index "1" has an assigned weight of "1", and, if the token bucket's accumulated weight is equal to its predetermined maximum accumulated weight, then this token bucket gives every $64^{th}$ designated data packet medium priority while the remaining packets retain their original low priority. Similarly, a token bucket corresponding to index "2" has an assigned weight of "2", and, if the token bucket's accumulated weight is equal to its predetermined maximum accumulated weight, then this token bucket gives every $33^{rd}$ designated data packet medium priority while the remaining packets retain their original low priority. The process continues from the token bucket corresponding to index "3", which has an assigned weight of "3", to the token bucket corresponding to index "15", which has an assigned weight of "63". As shown in the TABLE above, the token bucket corresponding to index 3 gives every $22^{nd}$ designated data packet medium priority while the remaining packets retain their original low priority, and, the token bucket corresponding to index 15 gives every $2^{nd}$ designated data packet medium priority while the remaining packets retain their original low priority. Because the token bucket corresponding to index 15 has the assigned weight of 63, at most one data packet would be rate limited before raising a low priority data packet to medium priority. It should be noted that even if some of the designated low priority data packets are given medium priority, such data packets may still be discarded or marked for subsequent discarding if X is less than or equal to −B (see FIG. 3).

The presently disclosed token bucket algorithm is described below using pseudo-code. In the algorithmic description below, "BC" means "byte count", "MBC" means "maximum byte count", "RBC" means "remaining byte count", "TS" means "timestamp", "pri" means "priority", "RW" means "relative weight", "AW" means "accumulated weight", and "MAXAW" means "maximum accumulated weight". The byte count (BC), the maximum byte count (MBC), and the remaining byte count (RBC) correspond to the number of credits contained in the token bucket. Further, each data packet has an associated priority (pri), and each token bucket has an assigned relative weight (RW) and accumulated weight (AW) and a timestamp (TS). Each data packet can also be assigned a temporary priority level (τpri). The relative weight (RW) of each token bucket corresponds to the entries in the third column of the TABLE above (Frequency of promoting low priority data packets to medium priority).

Pseudo-Code for Refreshing a Token Bucket

Initially, RBC=MBC.

(It is noted that bytes are only deducted after the 0/−MBC/−2*MBC check is performed to determine whether the data packet can pass. Bytes are not deducted if the data packet is going to be dropped. So long as the token bucket is not "empty", based on priority, it passes the data packet. The bytes are then deducted, and the token bucket may go further negative.)

Every $\frac{1}{16}$ second, the token bucket is refreshed with a number of credits equal to $(\frac{1}{16})^{th}$ of MBC.

TimePassed=currentTime−TS_of_token_bucket

Time is measured in $(\frac{1}{16})$ths of a second. For example, if $(\frac{1}{16})^{th}$ of a second passed, then TimePassed would be equal to $(\frac{1}{16})^{th}$ of a second. If 2 seconds passed, then TimePassed would be equal to 2 seconds.

```
Credits = TimePassed * MBC
If (Credits + RBC > MBC)
    RBC = MBC
else
    RBC = RBC + Credits
```

Pseudo-Code for Promoting a Low Priority Data Packet to Medium Priority

```
If (AW ≥ MAXAW)
    τpri = pri + 1
else
    τpri = pri
```

Pseudo-Code for Implementing a Rate Limiting Condition

```
If (τpri == high)
    τBC = -2*MBC
else if (τpri == medium)
    τBC = -MBC
else
    τBC = 0
If (RBC < τBC)
    AW = min(AW + RW, MAXAW)    */ Rate limit condition
else // Now deduct
    AW = 0                       */ No rate limit
    RBC = RBC - num-packet-bytes
```

The presently disclosed system and method of providing high speed, prioritized delivery of data packets over a broadband communications network employing a hierarchical, real-time, fair, weighted token bucket prioritization scheme will be better understood with reference to the following illustrative example and FIGS. 1-2. In this example, the hierarchy of token buckets 200 (see FIG. 2) is configured to meter multiple data flows corresponding to the plurality of subscriber systems 108.1-108.n. As shown in FIG. 2, the hierarchy of token buckets 200 includes the token buckets (TB) 208.1-208.n disposed at the first level of the hierarchy 200, the token buckets (TB) 206.1-206.n disposed at the second level of the hierarchy 200, the token buckets (TB) 204.1-204.n disposed at the third level of the hierarchy 200, and the token bucket (TB) 202 disposed at the fourth level of the hierarchy 200. The token buckets 208.1, 208.n in the first hierarchical level meter the data flows 210.p, 212.q, respectively, to provide a maximum data packet transmission rate (the application rate) of up to, e.g., 50 kbps, for low priority service applications such as P2P file sharing, or to implement a weighted prioritization scheme to assure that the data flows 210.p, 212.q containing low priority data packets are not starved of service. For example, each of the token buckets 208.1, 208.n may have an associated non-zero weight and an associated accumulated weight. The token bucket's non-zero weight is added to its accumulated weight when it is determined, by processing all of the buckets in the hierarchy, that a rate limit condition exists. When the accumulated weight of each token bucket 208.1, 208.n reaches a predetermined maximum accumulated weight, the priority of every $n^{th}$ data packet included in that data flow is raised to a next higher priority level, "n" being an integer having a determined value based upon the weight associated with the token bucket 208.1, 208.n. For example, the priority of a low priority data packet may be raised to medium priority, and the priority of a medium priority data packet may be raised to high priority.

Further, the token buckets 206.1-206.n in the second hierarchical level meter the data flows 210.1-210.p, 212.1-212.q to assure that the maximum data packet transmission rate, as defined for each subscriber by the service provider, is never exceeded. For example, the subscriber operating the subscriber system 108.1 may have selected a service plan with a maximum rate of 2 Mbps, while the subscriber operating the subscriber system 108.n may have selected a service plan with a maximum rate of 1 Mbps.

Moreover, the token buckets 204.1, 204.n in the third hierarchical level meter the data flows 210.1-210.p, 212.1-212.q corresponding to the subscriber systems 108.1, 108.n, respectively, to assure that the maximum aggregate bandwidth of the wireless base station is shared in a fair and dynamic manner among the currently active subscribers. For example, the token buckets 204.1, 204.n may allocate the minimum aggregate bandwidth of the subscriber (e.g., 10 Mbps) among all of the active subscribers using 17 priorities per subscriber service tier application bundle, in accordance with the TABLE above.

In addition, the token bucket 202 meters the data flows 210.1-210.p, 212.1-212.q corresponding to the subscriber systems 108.1, 108.n, respectively, to assure that the data flows 210.1-210.p, 212.1-212.q conform to the maximum aggregate bandwidth of the wireless base station (see FIG. 1). For example, the wireless base station may have a maximum aggregate bandwidth of 10 Mbps (bits per second) or any other suitable bandwidth. Because the disclosed system and method of providing high speed, prioritized delivery of data packets over a broadband network performs no buffering of the data packets, specified bandwidth and priority policies can be enforced in real-time with minimal latency.

It will further be appreciated by those of ordinary skill in the art that modifications to and variations of the above-described system and method of hierarchical virtual queuing may be made without departing from the inventive concepts disclosed herein. Accordingly, the invention should not be viewed as limited except as by the scope and spirit of the appended claims.

What is claimed is:

1. A method of controlling a plurality of data flows for subsequent transmission over a network, comprising:

receiving, at a control mechanism, said plurality of data flows, said control mechanism being implemented as a plurality of token buckets arranged in a hierarchy having a plurality of levels, each level of the hierarchy including at least one of said plurality of token buckets;

in a first metering step, metering, by at least one first token bucket included in a first level of the hierarchy, said plurality of data flows to assure fair sharing of a predetermined aggregate transmission bandwidth among the respective data flows;

in a second metering step, metering, by at least one second token bucket included in a second level of the hierarchy, said plurality of data flows to assure that said data flows conform to said predetermined aggregate transmission bandwidth;

wherein said plurality of data flows comprises at least one first data flow including a plurality of high priority data packets, at least one second data flow including a plurality of medium priority data packets, and at least one third data flow including a plurality of low priority data packets, said plurality of low priority data packets including a first sub-plurality of low priority data packets and at least one second sub-plurality of low priority data packets;

determining a size of at least one of said high priority data packets included in said received first data flow, said medium priority data packets included in said received second data flow, and said low priority data packets included in said received third data flow; and determining whether said at least one first token bucket included in said first level of the hierarchy contains at least a required number of credits corresponding to said determined size of said at least one data packet included in said received data flow; and performing one of passing said at least one data packet, dropping said at least one data packet, and marking said at least one data packet as being eligible for dropping, based upon whether said at least one first token bucket contains less than the required number of credits.

2. The method of claim 1 wherein said second metering step includes metering said plurality of data flows to enforce a specified maximum data packet transmission rate.

3. The method of claim 1 wherein said first metering step includes metering said plurality of data flows to enforce at least one of a maximum data packet transmission rate, an intermediate data packet transmission rate, a minimum data packet transmission rate, and a fair data packet transmission rate.

4. The method of claim 3:

wherein said first metering step includes enforcing said maximum data packet transmission rate upon said plurality of high priority data packets, enforcing said intermediate data packet transmission rate upon said plurality of medium priority data packets, enforcing said minimum data packet transmission rate upon said first sub-plurality of low priority data packets, and enforcing said fair data packet transmission rate upon said second sub-plurality of low priority data packets.

5. The method of claim 1 including:

determining whether said at least one first token bucket included in said first level of the hierarchy contains no credits or a determined negative number of credits; and in the event said at least one first token bucket contains no credits or said determined negative number of credits, performing one of dropping said plurality of low priority data packets, and marking said plurality of low priority data packets as being eligible for dropping.

6. The method of claim 1 including:

determining whether said at least one first token bucket included in said first level of the hierarchy contains more than a first predetermined negative number of credits; and in the event said at least one first token bucket contains more than said first predetermined negative number of credits, performing one of dropping said plurality of low priority data packets and said plurality of medium priority data packets, and marking said plurality of low priority data packets and said plurality of medium priority data packets as being eligible for dropping.

7. The method of claim 6 including:

determining whether said at least one first token bucket included in said first level of the hierarchy contains more than a second predetermined negative number of credits, said second predetermined negative number of credits being greater than said first predetermined negative number of credits; and in the event said at least one first token bucket contains more than said second predetermined negative number of credits, performing one of dropping said plurality of low priority data packets, said plurality of medium priority data packets, and said plurality of high priority data packets, and marking said plurality of low priority data packets, said plurality of medium priority data packets, and said plurality of high priority data packets as being eligible for dropping.

8. The method of claim 1 including:

determining a size of said low priority data packets included in said received third data flow;

determining whether said at least one first token bucket included in said first level of the hierarchy contains at least a required number of credits corresponding to said determined size of said low priority data packets included in said received third data flow; and wherein said first metering step includes, in the event said at least one first token bucket contains less than the required number of credits, enforcing said fair data packet transmission rate upon said second sub-plurality of low priority data packets using a weighted prioritization technique.

9. A method of controlling a plurality of data flows for subsequent transmission over a network, comprising:

receiving, at a control mechanism, said plurality of data flows, said control mechanism being implemented as a plurality of token buckets arranged in a hierarchy having a plurality of levels, each level of the hierarchy including at least one of said plurality of token buckets;

in a first metering step, metering, by at least one first token bucket included in a first level of the hierarchy, said plurality of data flows to assure fair sharing of a predetermined aggregate transmission bandwidth among the respective data flows and to enforce at least one of a maximum data packet transmission rate, an intermediate data packet transmission rate, a minimum data packet transmission rate, and a fair data packet transmission rate;

in a second metering step, metering, by at least one second token bucket included in a second level of the hierarchy, said plurality of data flows to assure that said data flows conform to said predetermined aggregate transmission bandwidth and to enforce a specified maximum data packet transmission rate;

wherein said plurality of data flows comprises at least one first data flow including a plurality of high priority data packets, at least one second data flow including a plurality of medium priority data packets, and at least one third data flow including a plurality of low priority data packets, said plurality of low priority packets including a first sub-plurality of low priority data packets and at least one second sub-plurality of low priority data packets; and wherein said first metering step includes enforcing said maximum data packet transmission rate upon said plurality of high priority data packets, enforcing said intermediate data packet transmission rate upon said plurality of medium priority data packets, enforcing said minimum data packet transmission rate upon said first sub-plurality of low priority data packets, and enforcing said fair data packet transmission rate upon said second sub-plurality of low priority data packets;

determining a size of said low priority data packets included in said received third data flow;

determining whether said at least one first token bucket included in said first level of the hierarchy contains at least a required number of credits corresponding to said determined size of said low priority data packets included in said received third data flow;

wherein said first metering step includes, in the event said at least one first token bucket contains less than the required number of credits, enforcing said fair data packet transmission rate upon said second sub-plurality of low priority data packets using a weighted prioritization technique;

wherein at least one of said at least one first token bucket and said at least one second token bucket has an associated weight and an associated accumulated weight, determining, by said at least one of said at least one first token bucket and said at least one second token bucket, whether a rate limiting condition exists with respect to said low priority data packets included in said received third data flow;

in the event said rate limiting condition exists, adding, by said at least one of said at least one first token bucket and said at least one second token bucket, said associated weight to said associated accumulated weight; and in the event said associated accumulated weight is greater than or equal to a predetermined maximum accumulated weight, performing said weighted prioritization technique including promoting every "$n^{th}$" low priority data packet included in said received third data flow to a next higher priority level, "n" being an integer having a determined value based upon the weight associated with said at least one of said at least one first token bucket and said at least one second token bucket.

10. A network switch, comprising:

a control mechanism, said control mechanism being implemented as a plurality of token buckets arranged in a hierarchy having a plurality of levels, each level of the hierarchy including at least one of said plurality of token buckets, wherein said control mechanism is configured:

to receive a plurality of data flows;

to meter, by at least one first token bucket included in a first level of the hierarchy, said plurality of data flows to assure fair sharing of a predetermined aggregate transmission bandwidth among the respective data flows; and to meter, by at least one second token bucket included in a second level of the hierarchy, said plurality of data flows to assure that said data flows conform to said predetermined aggregate transmission bandwidth;

wherein said at least one first token bucket included in said first level of the hierarchy is configured to meter said plurality of data flows to enforce at least one of a maximum data packet transmission rate, an intermediate data packet transmission rate, a minimum data packet transmission rate, and a fair data packet transmission rate;

wherein said plurality of data flows comprises at least one first data flow including a plurality of high priority data packets, at least one second data flow including a plurality of medium priority data packets, and at least one third data flow including a plurality of low priority data packets, said plurality of low priority data packets including a first sub-plurality of low priority data packets and at least one second sub-plurality of low priority data packets;

wherein said at least one first token bucket included in said first level of the hierarchy is configured to enforce said maximum data packet transmission rate upon said plurality of high priority data packets, to enforce said intermediate data packet transmission rate upon said plurality of medium priority data packets, to enforce said minimum data packet transmission rate upon said first sub-plurality of low priority data packets, and to enforce said fair data packet transmission rate upon said second sub-plurality of low priority data packets;

wherein at least one of said at least one first token bucket and said at least one second token bucket has an associated weight and an associated accumulated weight, and wherein said control mechanism is further configured:

to determine a size of said low priority data packets included in said received third data flow;

to determine whether said at least one first token bucket included in said first level of the hierarchy contains at least a required number of credits corresponding to said determined size of said low priority data packets included in said received third data flow;

wherein said at least one first token bucket included in said first level of the hierarchy is configured, in the event said at least one first token bucket contains less than the required number of credits, to enforce said fair data packet transmission rate upon said second sub-plurality of low priority data packets using a weighted prioritization technique;

to determine whether a rate limiting condition exists with respect to said low priority data packets included in said received third data flow;

in the event said rate limiting condition exists, to add said associated weight to said associated accumulated weight; and in the event said associated accumulated weight is greater than or equal to a predetermined maximum accumulated weight, to perform said weighted prioritization technique including promoting every "$n^{th}$" low priority data packet included in said received third data flow to a next higher priority level, "n" being an integer having a determined value based upon the weight associated with said at least one of said at least one first token bucket and said at least one second token bucket.

11. The network switch of claim 10 wherein said control mechanism is configured:

to determine a size of at least one of said high priority data packets included in said received first data flow, said medium priority data packets included in said received second data flow, and said low priority data packets included in said received third data flow;

to determine whether said at least one first token bucket included in said first level of the hierarchy contains at least a required number of credits corresponding to said determined size of said at least one data packet included in said received data flow; and to perform one of passing said at least one data packet, dropping said at least one data packet, and marking said at least one data packet as being eligible for dropping, based upon whether said at least one first token bucket contains less than the required number of credits.

12. The network switch of claim 10 wherein said control mechanism is configured:

to determine whether said at least one first token bucket included in said first level of the hierarchy contains no credits or a determined negative number of credits; and in the event said at least one first token bucket contains no credits or said determined negative number of credits, to perform one of dropping said plurality of low priority data packets, and marking said plurality of low priority data packets as being eligible for dropping.

13. The network switch of claim 10 wherein said control mechanism is configured:

to determining whether said at least one first token bucket included in said first level of the hierarchy contains more than a first predetermined negative number of credits; and in the event said at least one first token bucket contains more than said first predetermined negative number of credits, to perform one of dropping said plurality of low priority data packets and said plurality of medium priority data packets, and marking said plurality of low priority data packets and said plurality of medium priority data packets as being eligible for dropping.

14. The network switch of claim 13 wherein said control mechanism is configured:

to determining whether said at least one first token bucket included in said first level of the hierarchy contains more than a second predetermined negative number of credits, said second predetermined negative number of credits being greater than said first predetermined negative number of credits; and in the event said at least one first token bucket contains more than said second predetermined negative number of credits, to perform one of dropping said plurality of low priority data packets, said plurality of medium priority data packets, and said plurality of high priority data packets, and marking said plurality of low priority data packets, said plurality of medium priority data packets, and said plurality of high priority data packets as being eligible for dropping.

15. The network switch of claim 10 wherein said at least one second token bucket included in said second level of the hierarchy is configured to meter said plurality of data flows to enforce a specified maximum data packet transmission rate.

* * * * *

UNITED STATES PATENT AND TRADEMARK OFFICE
CERTIFICATE OF CORRECTION

PATENT NO. : 7,826,358 B2  Page 1 of 1
APPLICATION NO. : 11/648141
DATED : November 2, 2010
INVENTOR(S) : Bruce E. Caram It is certified that error appears in the above-identified patent and that said Letters Patent is hereby corrected as shown below:

In Claim 9, column 16, line 39, after "priority" insert the word --data--.

Signed and Sealed this
Twenty-second Day of February, 2011

David J. Kappos
*Director of the United States Patent and Trademark Office*